United States Patent
Chang et al.

(10) Patent No.: US 12,044,351 B2
(45) Date of Patent: Jul. 23, 2024

(54) ROTARY DEVICE WITH AUTOMATIC RESET FUNCTION AND DISPLAY SCREEN USING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Chih-Cheng Lee, New Taipei (TW); Wen-Bin Huang, New Taipei (TW); Tsung-Hsin Wu, New Taipei (TW); Yu-Chih Cheng, New Taipei (TW); Hsiu-Fu Li, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 195 days.

(21) Appl. No.: 17/901,086

(22) Filed: Sep. 1, 2022

(65) Prior Publication Data
US 2023/0322166 A1  Oct. 12, 2023

(30) Foreign Application Priority Data
Apr. 12, 2022  (CN) .......................... 202210383382.5

(51) Int. Cl.
*G06F 1/16* (2006.01)
*B60R 11/02* (2006.01)
(Continued)

(52) U.S. Cl.
CPC ......... *F16M 11/10* (2013.01); *B60R 11/0235* (2013.01); *G06F 1/16* (2013.01); *B60R 2011/0085* (2013.01)

(58) Field of Classification Search
CPC ............. B60R 11/0229; B60R 11/0235; B60R 2011/0084; B60R 2011/0085;
(Continued)

(56) References Cited

U.S. PATENT DOCUMENTS

2008/0029680 A1* 2/2008 Maxson ........... G01R 31/31905
248/637

FOREIGN PATENT DOCUMENTS

CN     106877750 A    6/2017
JP     08278165 A  * 10/1996

* cited by examiner

*Primary Examiner* — Adrian S Wilson
(74) *Attorney, Agent, or Firm* — ScienBiziP, P.C.

(57) ABSTRACT

A rotary device with automatic reset function for precise stopping and holding of a viewable rotating element without free play or slop remaining includes a conversion assembly, and a power assembly with output element and sensing assembly. The conversion assembly comprises a light-shielding structure with the light-shielding structure on the extension part. The power assembly with output element can drive the extension part to rotate synchronously with the light-shielding structure. The detachable sensing assembly overlaps the rotation path of the light-shielding structure, and the conversion assembly rotates at different angles so that the light-shielding structure and the sensing assembly will match at certain angles, so as to trigger a sensing signal and call up the output element. A display screen includes the rotary device with automatic reset function and a display assembly.

18 Claims, 6 Drawing Sheets

(51) Int. Cl.
*F16M 11/10* (2006.01)
*B60R 11/00* (2006.01)

(58) Field of Classification Search
CPC .... B60R 2011/0087; B60R 2011/0092; F16M 11/00; F16M 11/02; F16M 11/04; F16M 11/06; F16M 11/08; F16M 11/10; F16M 11/105; F16M 11/12; F16M 11/121; F16M 11/123; F16M 11/125; F16M 11/126; F16M 11/128; F16M 11/114
USPC .............. 348/837; 248/917–924; 361/679.22
See application file for complete search history.

ROTARY DEVICE WITH AUTOMATIC RESET FUNCTION AND DISPLAY SCREEN USING THE SAME

FIELD

The subject matter relates to automobile central control panels, and in particular, to a rotary device with automatic reset function and a display screen using the same.

BACKGROUND

With the popularization of in-vehicle multimedia devices, larger and more flexible in-vehicle central control display screens are required by drivers. The vehicle central control panel is mostly a single mechanical rotating structure. Due to gaps and tolerances in the rotating transmission gear, there is free play or slop of about 3° after the central control panel is rotated.

As such, the existing central control display screen can be deflected, and it is difficult to stop the rotation of the central control display screen in horizontal or vertical positions with precision.

SUMMARY

A rotary device with automatic reset function for precise stopping and holding of a viewable rotating element without free play or slop remaining includes a conversion assembly, and a power assembly with output element and sensing assembly. The conversion assembly comprises a light-shielding structure with the light-shielding structure on the extension part. The power assembly with output element can drive the extension part to rotate synchronously with the light-shielding structure. The detachable sensing assembly overlaps the rotation path of the light-shielding structure, and the conversion assembly rotates at different angles so that the light-shielding structure and the sensing assembly will match at certain angles, so as to trigger a sensing signal and call up the output element. A display screen includes the rotary device with automatic reset function and a display assembly.

DETAILED DESCRIPTION

Figure 1:
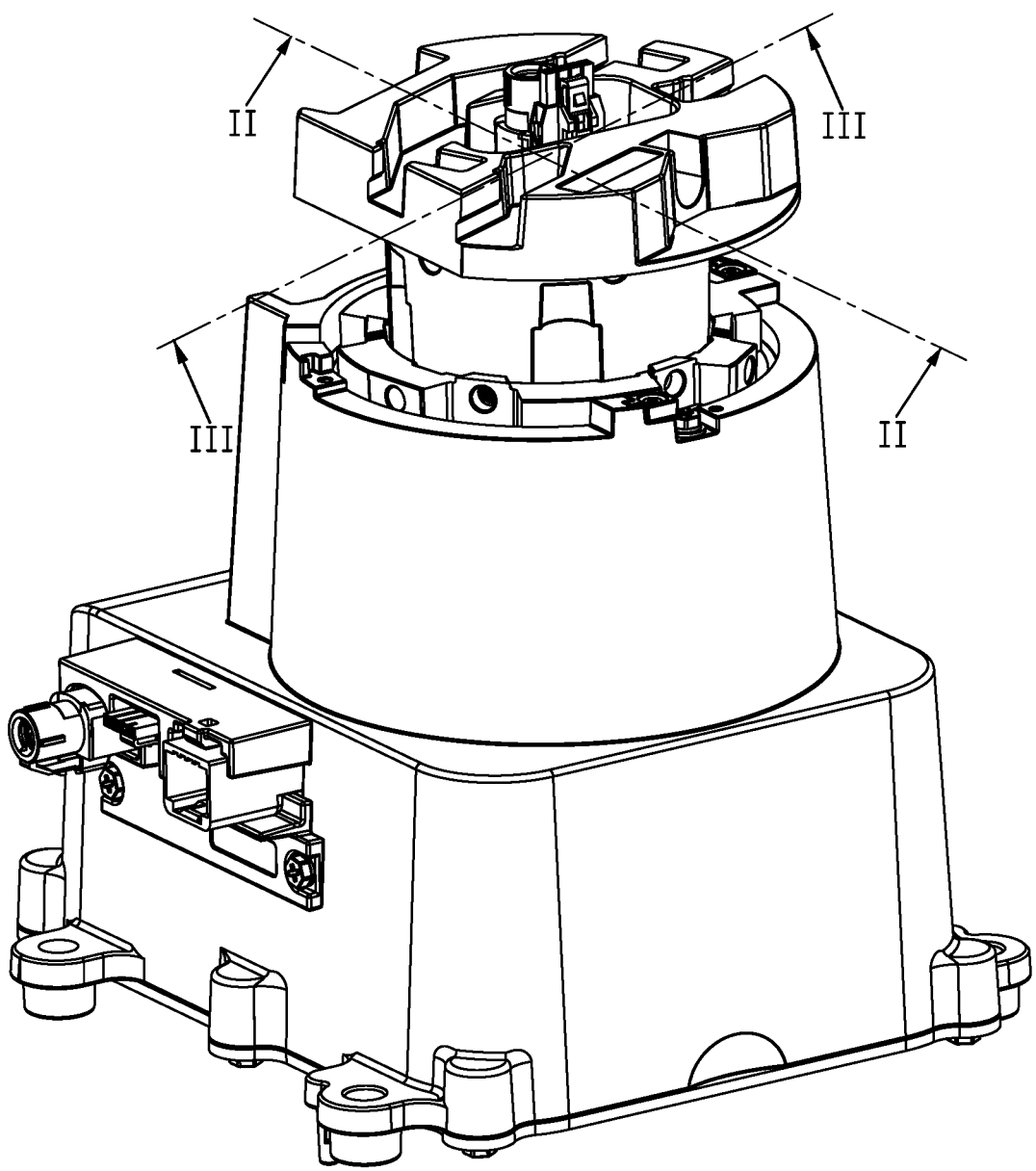
FIG. 1 is a schematic perspective view of a rotary device with automatic reset function.
Figure 2:
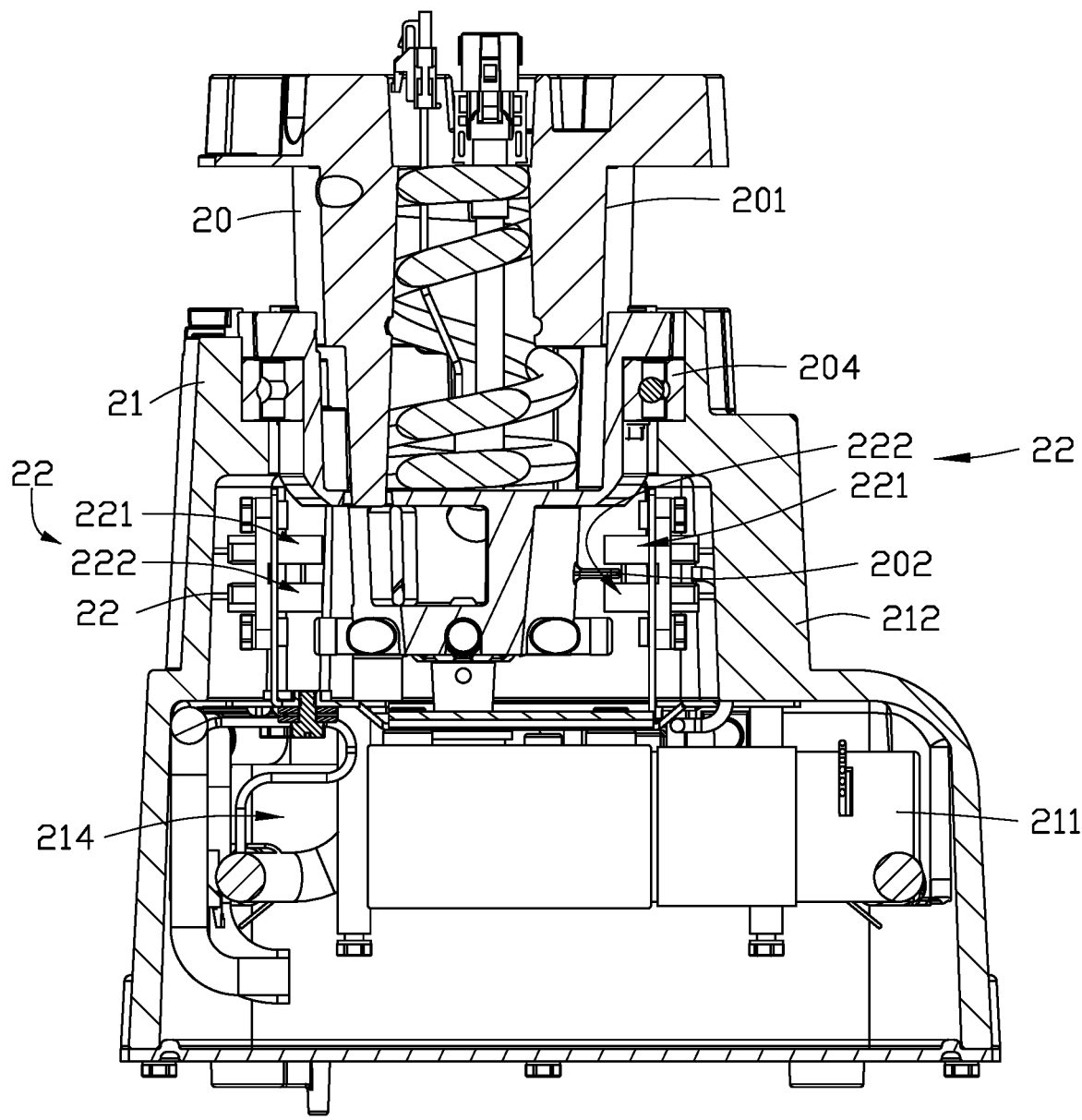
FIG. 2 is a schematic cross-sectional view along a line II-II of FIG. 1.
Figure 3:
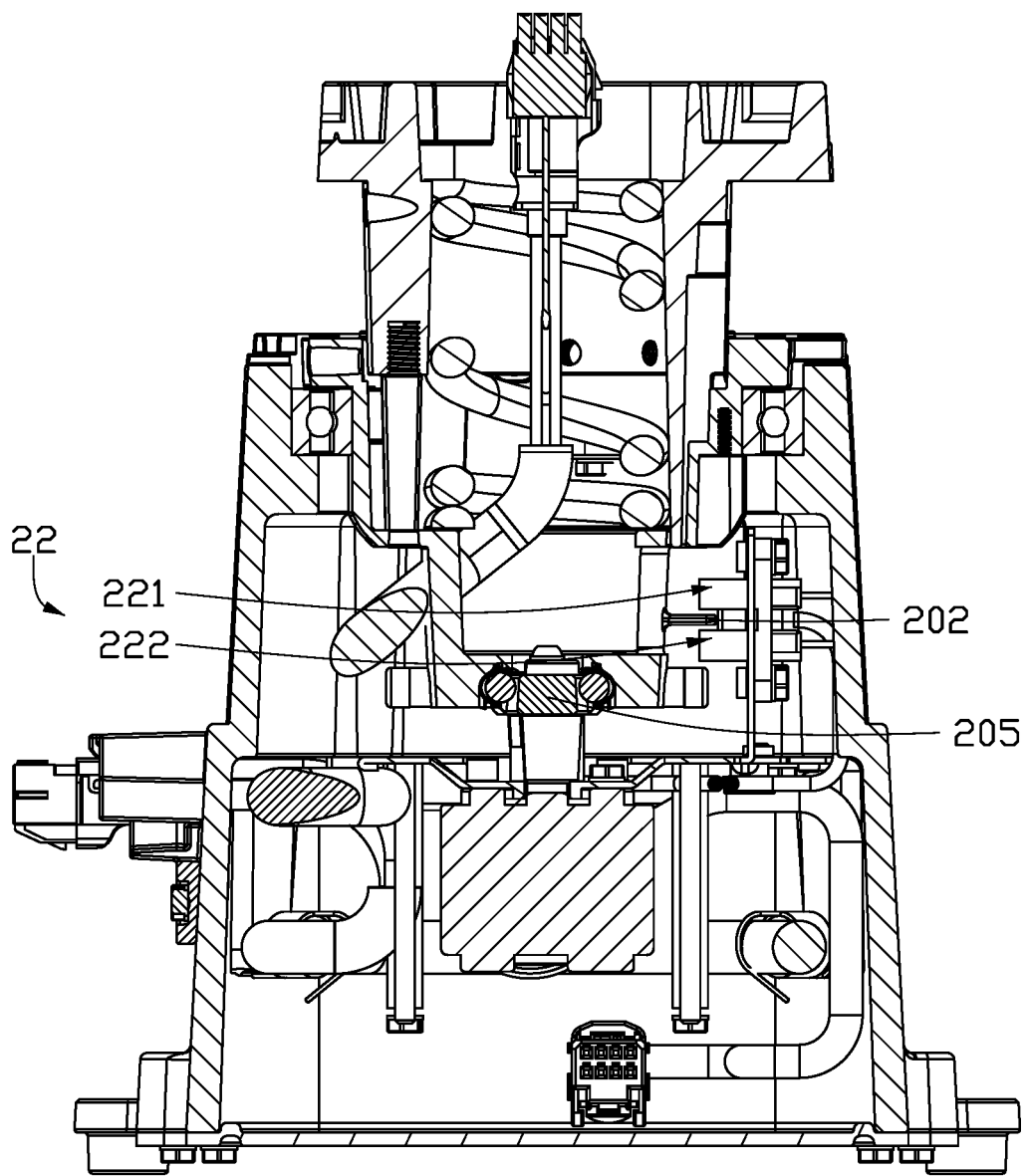
FIG. 3 is a schematic cross-sectional view along a line of FIG. 1.
Figure 4:
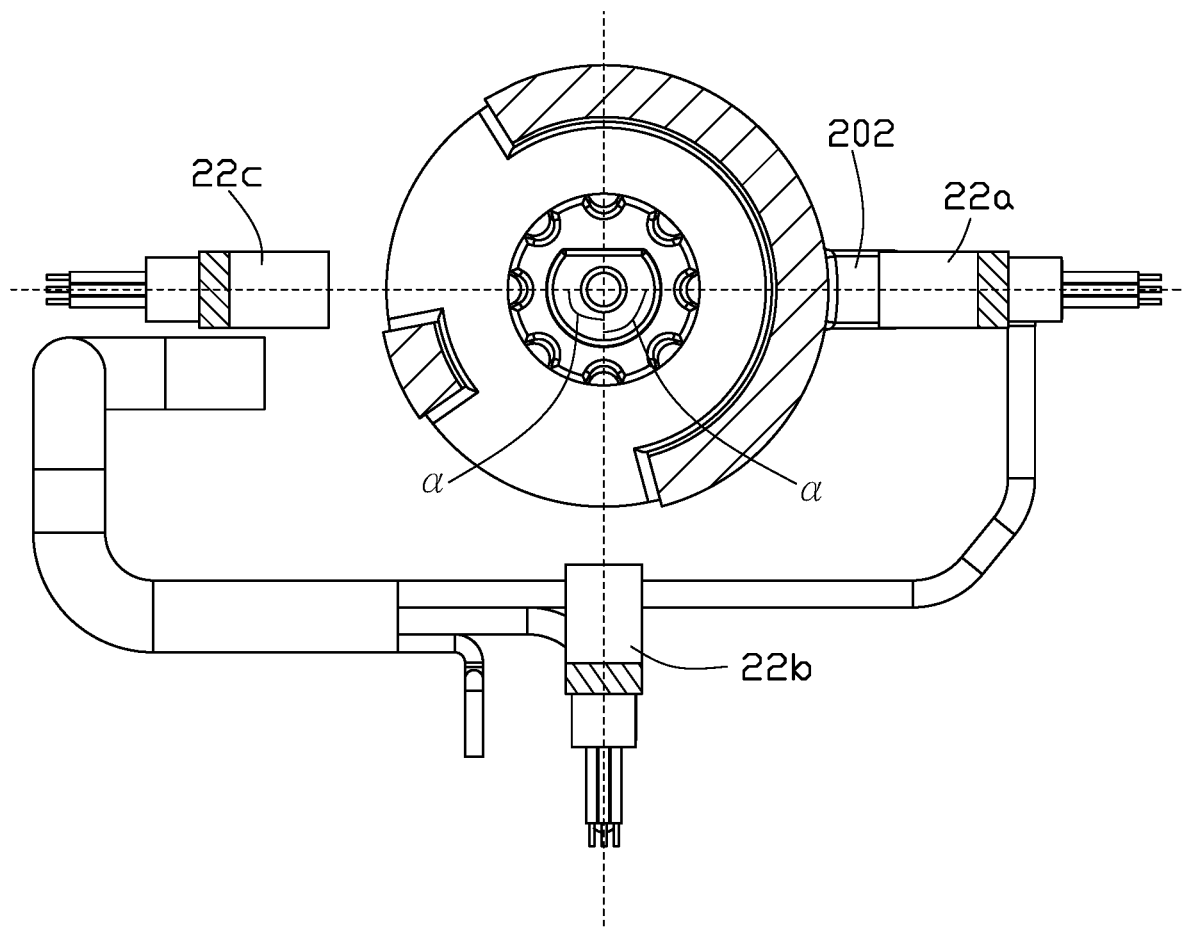
FIG. 4 is a schematic view of a sensing assembly of the rotary device with automatic reset function of FIG. 1.
Figure 5:
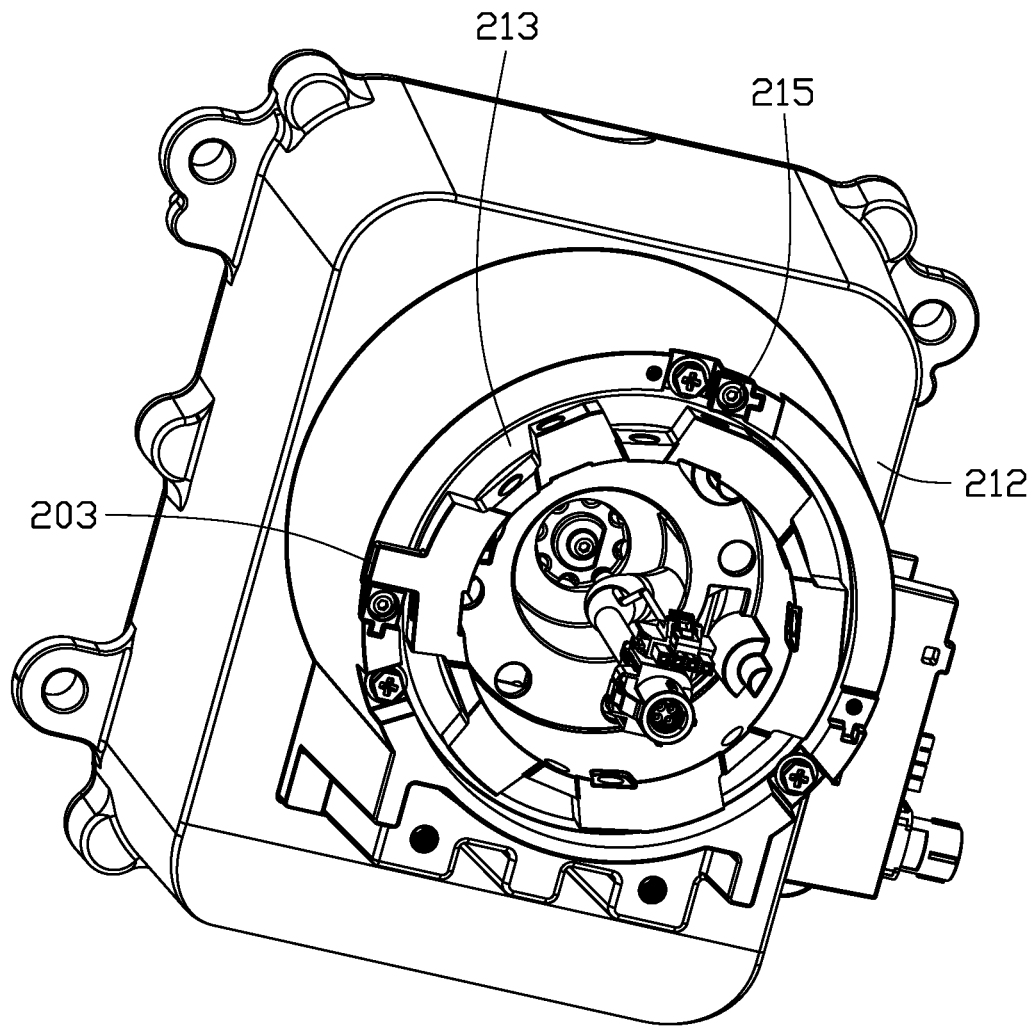
FIG. 5 is a perspective view of a first stop structure and a second stop structure of the rotary device with automatic reset function of FIG. 1.

The technical solutions of the present invention will be clearly and completely described below in conjunction with embodiments. Obviously, the described embodiments are a part of the embodiments of the present invention, but not all of the embodiments. Based on the embodiments of the present invention, all other embodiments obtained by those of ordinary skill in the art without creative work shall fall within the protection scope of the present invention.

As shown in FIG. 1 to FIG. 5, a rotary device 2 includes a conversion assembly 20, a power assembly 21, and a sensing assembly 22.

The conversion assembly 20 includes an extension part 201 and a light-shielding structure 202, and the light-shielding structure 202 is connected to the extension part 201. The power assembly 21 includes an output element 211. The output element 211 can drive the extension part 201. The extension part 201 rotates synchronously with the light-shielding structure 202. The sensing assembly 22 is disposed at the position of the rotation path of the light-shielding structure 202, and the conversion assembly 20 rotates at different angles so that the light-shielding structure 202 and the sensing assembly 22 can be matched to trigger the sensing signal of the sensing assembly 22. The sensing assembly 22 is electrically connected to the output element 211.

By arranging the sensing assembly 22 and the light-shielding structure 202, the output element 211 drives the conversion assembly 20 to rotate. The sensing assembly 22 is disposed on the rotation plane of the light-shielding structure 202, and the path of the light-shielding structure 202 during rotation passes through the sensing assembly 22. When the light-shielding structure 202 rotates to the position where it cooperates with the sensing assembly 22, the sensing assembly 22 generates an arriving signal; when the light-shielding structure 202 rotates away from its matching position with the sensing assembly 22, the sensing assembly 22 generates a distant signal.

Compared with the traditional gear rotation, the positional accuracy of the structure in which the light-shielding structure 202 cooperates with the sensing assembly 22 is higher. The sensing assembly 22 can generate signals in real time to provide real-time and accurate signals as to position. The sensing assembly 22 is electrically connected to the output element 211. The sensing assembly 22 is connected with the output element 211. The sensing assembly 22 transmits the position signal to the output element 211. The output element 211 controls the rotation angle of the shaft according to the position signal and drives the conversion assembly 20 to rotate or to stop rotating, thereby eliminating the rotation error of the rotary device 2, so as to achieve the effect that the output element 211 precisely controls the final position of the conversion assembly 20.

In this embodiment, the output element 211 provides the rotational torque of the conversion assembly 20 according to the signal of the sensing assembly 22. The conversion assembly 20 takes the rotation axis of the output element 211 as the rotation axis. The conversion assembly 20 includes an extension part 201 and a light-shielding structure 202. The light-shielding structure 202 is radially extended on the surface of the extension part 201. The light-shielding structure 202 is disposed in a specific area and position on the outer circumference of the extension part 201, and the light-shielding structure 202 rotates synchronously with the extension part 201. The sensing assembly 22 is disposed on the plane of the light-shielding structure 202. The rotating path of the light-shielding structure 202 passes through the sensing assembly 22.

In this embodiment, when the light-shielding structure 202 reaches the position where it cooperates with the sensing assembly 22, the sensing assembly 22 senses the light-shielding structure 202, and generates a signal indicating arrival, which is transmitted to the output element 211, and the output element 211 stops the rotation. The shaft rotates, and the conversion assembly 20 stops at this time. When the light-shielding structure 202 is at a position away from the sensing assembly 22, the light-shielding structure 202 is not sensed, and so generates a signal indicating distance, the distance signal is transmitted to the output element 211, and the output element 211 continues the rotational movement of the shaft. The conversion assembly 20 continues to rotate.

In other embodiments, the output element 211 can also change the rotational torque of the shaft to cause the current of the output element 211 to change, so that the output element 211 can control the rotational position of the conversion assembly 20 according to the current value signal. When the conversion assembly 20 rotates normally, the current in the output element 211 is the first load current, and the value of the first load current is less than or equal to a predetermined threshold, and the predetermined threshold may be 0.492 A. When the current value in the output element 211 is less than or equal to 0.492 A, the output element 211 controls the shaft to continuously rotate in the same direction. When the rotation of the conversion assembly 20 is blocked, the conversion assembly 20 prevents the normal torque output of the rotating shaft, and the torque output corresponding to the rotation of the rotating shaft increases, thereby increasing the load of the output element 211, and the value of the second load current of the output element 211 becomes greater than the preset threshold. When the value of the second load current is greater than the preset threshold value for more than 50 ms, the output element 211 controls the conversion assembly 20 to rotate in reverse to the starting position. By sensing the internal current signal of the output element 211 and the electrical signal generated by the sensing assembly 22, the output element 211 can be controlled to rotate forward or in reverse, so that the output element 211 can precisely control the rotation state of the conversion assembly 20 and eliminate the rotary device 2 rotation error.

In one embodiment, the sensing assembly 22 includes a light-emitting element 221 and a light-receiving element 222. The light-emitting element 221 and the light-receiving element 222 realize optical signal interaction through a light path. The light path passes through the rotation plane of the light-shielding structure 202. The light-shielding structure 202 blocks the light path when it is rotated to a certain preset angle.

Further, the light-emitting element 221 is used for emitting light, and the light-receiving element 222 is used for receiving light. Through the interaction of the light path between the light-emitting element 221 and the light-receiving element 222, the sensing assembly 22 generates a corresponding connection signal or disconnection signal. The sensing assembly 22 is selected to be preset at specific rotation angles when in a horizontal position, a vertical position, or other position. When the light-shielding structure 202 rotates to one of the preset angles, the light-shielding structure 202 blocks the light path, the sensing assembly 22 generates a disconnection signal, and the output element 211 controls the rotating shaft to stop rotating. Before the light-shielding structure 202 has rotated to the preset angle, the light-shielding structure 202 does not block the light path, the sensing assembly 22 generates a connection signal, and the output element 211 controls the shaft to continue to rotate.

The photoelectric sensing position precision of the light-shielding structure 202 in cooperation with the light-emitting element 221 and the light-receiving element 222 can reach nanometer level. The light-shielding structure 202 rotates to connect or disconnect the light path between the light-emitting element 221 and the light-receiving element 222. The sensing assembly 22 converts the real-time optical signal indicating connection or disconnection into an electrical signal. And the sensing assembly 22 transmits the electrical signal to the output element 211 to control the rotation or cessation of rotation of the shaft.

In this embodiment, there are multiple sensing assemblies 22. And the multiple sensing assemblies 22 are arranged at multiple angular positions in the rotation plane of the light-shielding structure 202, such as horizontal positions, vertical positions or other specific rotation angles. The sensing assembly 22 is electrically connected with the output element 211, and the output element 211 controls the rotation shaft to rotate or stop rotation according to the signal of the sensing assembly 22. The output element 211 precisely controls the rotation state of the conversion assembly 20 and stops the conversion assembly 20 at a specific position, thereby eliminating the rotation error of the automatic reset rotary device 2.

In one embodiment, the sensing assembly 22 includes a plurality of elements with the same structure, such as a first group of sensing assemblies 22a, a second group of sensing assemblies 22b, and a third group of sensing assemblies 22c. A difference between the light paths of two adjacent sensing assemblies 22 is a preset angle α.

Further, the position of the first group of sensing assemblies 22a is the starting position of the rotation of the conversion assembly 20, and the output element 211 starts to rotate from the starting position. When the conversion assembly 20 rotates to the light-shielding structure 202 to block the light path of the second group of sensing assemblies 22b, the second group of sensing assemblies 22b sends a disconnection signal to the output element 211, the output element 211 stops rotating, and the conversion assembly 20 stops. The conversion assembly 20 can continue to rotate forward to the light-shielding structure 202 to block the light path of the third group of sensing assemblies 22c, or reverse to the light-shielding structure 202 to block the light path of the first group of sensing assemblies 22a.

If there is rotation in the forward direction, the output element 211 drives the conversion assembly 20 to rotate. When the conversion assembly 20 rotates in the forward direction until the light-shielding structure 202 blocks the light path of the third group of sensing assemblies 22c, the third group of sensing assemblies 22c sends a disconnection signal to the output element 211. The output element 211 stops rotating, and the conversion assembly 20 stops at the position corresponding to the third group of sensing assemblies 22c. When receiving a forward rotation signal at other positions, the output element 211 continues to rotate forward from the position corresponding to the third group of sensing assemblies 22c until it rotates to the position corresponding to another adjacent group of sensing assemblies 22.

If the rotation is reversed, the output element 211 drives the conversion assembly 20 to rotate in reverse. When the conversion assembly 20 rotates until the light-shielding structure 202 blocks the light path of the first group of sensing assemblies 22a, the first group of sensing assemblies 22a sends a disconnection signal to the output element 211, and the output element 211 stops rotating, and the conversion assembly 20 stops at the position corresponding to the first group of sensing assemblies 22a. When a reverse rotation signal is received at other positions, the output element 211 starts to reversely rotate from this position until it rotates to a position corresponding to another adjacent group of sensing assemblies 22.

The sensing assemblies 22 are used to set a plurality of specific positions, so that the output element 211 can precisely control the conversion assembly 20 to stop at a positive horizontal or positive vertical position, thereby eliminating the rotation error of the automatic reset rotating device 2.

In one embodiment, the angle of the light paths between two adjacent sensing assemblies 22 is 90° or 180°.

In this embodiment, the light-shielding structure 202 and the sensing assembly 22 are substantially disposed at the same level, and the rotation path of the light-shielding structure 202 passes between the light-emitting element 221 and the light-receiving element 222 of the sensing assembly 22. The light-shielding structure 202 is detachably matched with the sensing assembly 22. Three sets of sensing assemblies 22 are disposed on the rotation plane of the light-shielding structure 202. The angle between the light path and the light path of the second group of sensing assemblies 22b is 90°, and the angle between the light path of the second group of sensing assemblies 22b and the light path of the third group of sensing assemblies 22c is 90°. The position of the first set of sensing assemblies 22a is defined as a reference position of 0°, the position of the second set of sensing assemblies 22b is the position separated from the reference position by 90°, and the position of the third set of sensing assemblies 22c is the position separated from the reference position by 180°. The conversion assembly 20 rotates at the opening 213 of the casing 212, adjusts the placement position of the calibration casing 212, and stops the conversion assembly 20 at the positive horizontal and vertical positions of 0°, 90°, and 180°, so that the output element 211 controls the conversion assembly 20 to rotate and stop at the positive horizontal and vertical positions, thereby eliminating the rotation error of the rotary device 2.

In one embodiment, the power assembly 21 further includes a casing 212. The casing 212 is provided with a cavity 214 with an opening 213. The output element 211 is provided in the cavity 214. The extension part 201 is partially disposed in the cavity 214 and extends from the opening 213 to the outside of the casing 212. The sensing assembly 22 is disposed in the cavity 214 of the casing 212. The light-shielding structure 202 is disposed in the cavity 214.

Further, the casing 212 can be used to fix the output element 211 and the sensing assembly 22. The sensing assemblies 22 are distributed according to a preset rotation angle in the cavity 214 with the rotation axis of the output element 211 as the center. The extension part 201 rotates relative to the casing 212. The sensing assembly 22 and the converting assembly 20 are fixed on the casing 212. By adjusting the angle between the light paths of the two adjacent sensing assemblies 22, the preset rotational position of the converting assembly 20 is achieved, which improves the rotation accuracy of the sensing assembly 22 and the converting assembly 20.

In one embodiment, the casing 212 further includes a first stop structure 215. The first stop structure 215 is disposed in the opening 213 of the casing 212. The first stop structure 215 extends from the opening 213 in a direction close to the extension part 201. The conversion assembly 20 includes a second stop structure 203. The second stop structure 203 is connected to the extension part 201. The second stop structure 203 is disposed outside the cavity 214 and extends toward the direction of the opening 213. The power assembly 21 drives the second stop structure 203 to rotate, so that the first stop structure 215 abuts against the second stop structure 203.

Further, the light-shielding structure 202 triggers the sensing signal of the sensing assembly 22. The sensing assembly 22 transmits the sensing signal to the output element 211. The output element 211 receives the sensing signal and controls the rotation of the shaft to stop. When the first stop structure 215 abuts against the second stop structure 203, the conversion assembly 20 is prevented from rotating. Specifically, the conversion assembly 20 is subjected to the resistance generated by the mutual resistance of the first stop structure 215 and the second stop structure 203, and the output element 211 feels the output obstruction caused by the resistance, so that the inner part of the output element 211 is blocked. The current thus changes, causing the output element 211 to stop.

In this embodiment, the light-shielding structure 202 triggers the sensing signal of the sensing assembly 22 to stop the output element 211. When the sensing assembly 22 senses the light-shielding structure 202, the sensing signal is transmitted to the output element 211, and the output element 211 stops. The second stop structure 203 is fixedly connected with the conversion assembly 20. When the conversion assembly 20 rotates to a position where the first stop structure 215 and the second stop structure 203 abut, the second stop structure 203 is subject to the first stop structure 215 and the output element 211 is called up. Due to the load then being greater than the normal load, the internal current of the output element 211 changes, so that the value of the internal current of the output element 211 is greater than the value of the normal load current (for example, 0.492 A). At the same time, the output element 211 is combined with the sensing signal, and this action will also stop the output element 211, so that the conversion assembly 20 stops at a preset position, thereby eliminating the rotation error of the rotary device 2.

In one embodiment, the angle between the first stop structure 215 and the second stop structure 203 may be 90°.

In this embodiment, the conversion assembly 20 starts to rotate from the starting position (0°), the second stop structure 203 is arranged at the horizontal position of the opening 213, and the first stop structure 215 is arranged at the vertical position of the opening 213. The rotation angle between the stop structure 215 and the second stop structure 203 is 90°. When the conversion assembly 20 rotates to the 90° position, the first stop structure 215 and the second stop structure 203 are abutted at this time, and the light-shielding structure 202 is close to the sensing assembly 22, so that the sensing signal is transmitted to the output element 211, and the output element 211 stops.

In one embodiment, the conversion assembly 20 further includes a bearing 204. The bearing 204 is provided between the extension part 201 and the casing 212. The bearing 204 is disposed in the cavity 214 on the side close to the opening 213. The bearing 204 is fixedly connected to the casing 212, and the bearing 204 is rotatably connected to the extension part 201.

Further, the outer surface of the bearing 204 is arranged coaxially with the opening 213 of the casing 212, and the inner surface of the bearing 204 is arranged coaxially with the rotating shaft of the output element 211. Further, the extension part 201 is rotated coaxially with respect to the central axis of the casing 212, so as to improve the rotation accuracy of the conversion assembly 20 and reduce errors in the rotation process.

In this embodiment, the bearing 204 is nested at the opening 213 of the casing 212. The opening 213 of the casing 212 is an annular surface, and the central axis of the annular surface is coaxial with the rotation axis of the output element 211. The annular surface mates with the outer surface of bearing 204. A support structure is provided around the opening 213, the support structure provides a step for snap-fitting the bearing 204, and the outer surface of the bearing 204 is disposed on the support structure. The extension part 201 is nested on the inner surface of the bearing 204. The conversion assembly 20 is rotatably connected with the output element 211 by means of the bearing 204. The bearing 204 fixes the extension part 201 at the opening 213, and the bearing 204 is improves the rotational stability of the conversion assembly 20 relative to the casing 212, improving the rotation accuracy of the conversion assembly 20, and reducing the error of the rotation angle.

In one embodiment, the conversion assembly 20 further includes a coupling 205. The coupling 205 is connected with the extension part 201. The coupling 205 is rotatably connected with the output element 211 (egg, the coupling 205 is connected with the rotating shaft of the output element 211), and the extension part 201 and the output element 211 are rotatably connected by the coupling 205.

Further, the coupling 205 can be used to improve the rotational smoothness between the extension part 201 and the output element 211 and improve the rotational accuracy of the conversion assembly 20.

In this embodiment, one end of the coupling 205 is fixedly connected with the extension part 201, and the extension part 201 and the coupling 205 rotate synchronously. A circular sleeve is provided in the center of the coupling 205, and the circular sleeve is connected with the output element 211 (for example, the circular sleeve is connected with the rotating shaft of the output element 211).

Figure 6:
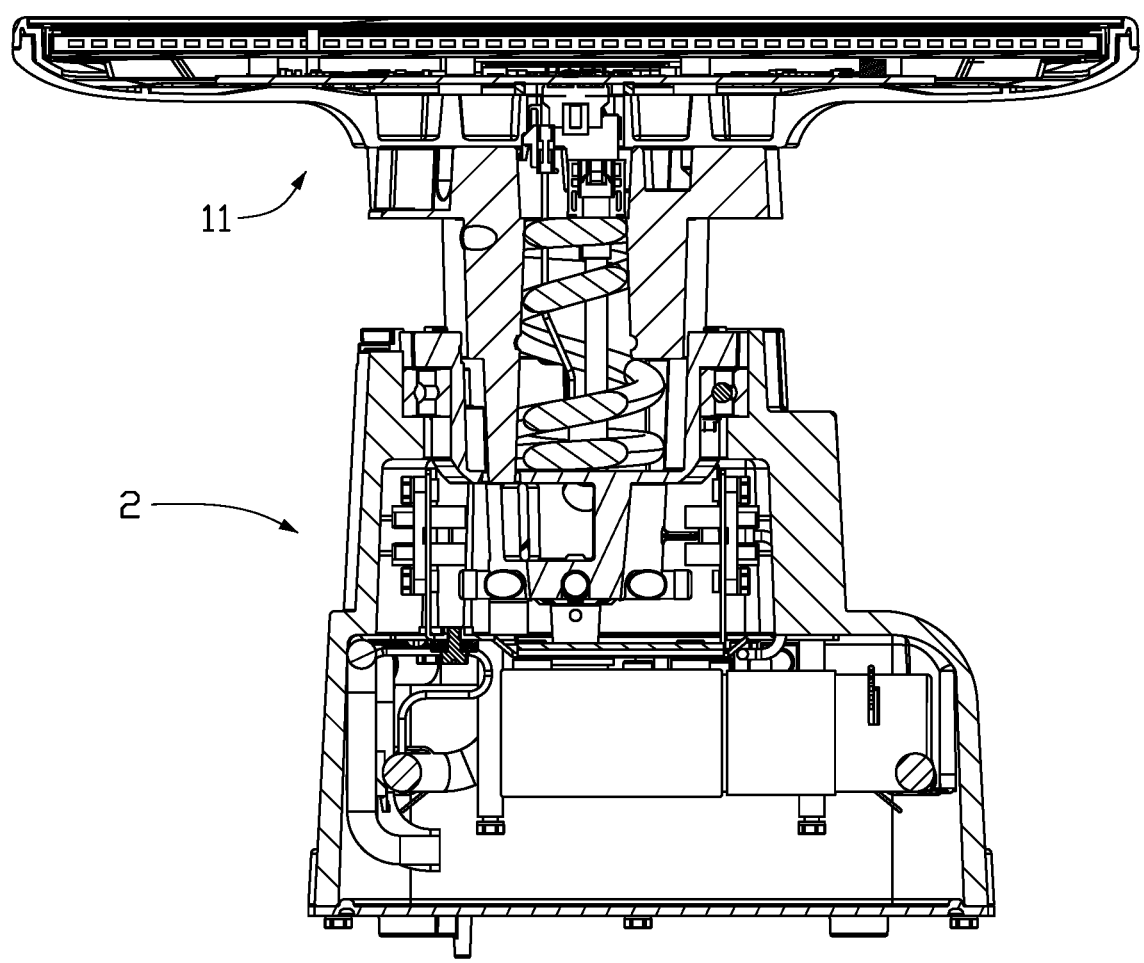
FIG. 6 is a schematic view of a display screen.

As shown in FIG. 6, a display screen 1 includes a display assembly 11 and a rotary device 2. The display assembly 11 is connected to the conversion assembly 20. The display assembly 11 is disposed on the side of the conversion assembly 20 away from the power assembly 21.

Further, the automatic reset and rotation device 2 is applied to the display screen 1, so that the display screen 1 can be rotated and stopped at a vertical or horizontal position, thereby eliminating the rotation error of the automatic reset and rotation device 2.

The output element 211 precisely controls the rotation of the conversion assembly 20 to stop in a vertical or horizontal position. The conversion assembly 20 drives the display assembly 11 to rotate coaxially, so that the display assembly 11 stops at a vertical or horizontal position.

In this embodiment, the display assembly 11 is fixedly connected with the conversion assembly 20, and the output element 211 precisely controls the conversion assembly 20 to rotate and stop at a vertical or horizontal position. The conversion assembly 20 drives the display assembly 11 to rotate coaxially, so that the display assembly 11 stops in a vertical or horizontal position, so that the display screen 1 has the effect of stopping the display screen 1 in a vertical or horizontal position, and the rotation error of the rotary device 2 is eliminated.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A rotary device with automatic reset function comprising:
   a conversion assembly comprising an extension part and a light-shielding structure, the light-shielding structure being connected with the extension part;
   a power assembly comprising an output element, the output element being in driving connection with the extension part, and the extension part being rotatable synchronously with the light-shielding structure; and
   at least one sensing assembly arranged to overlap with a rotation path of the light-shielding structure, and the conversion assembly being rotatable to various angles so that the light-shielding structure and the sensing assembly become detachably matched, wherein when the light-shielding structure and the sensing assembly are detachably matched, the sensing assembly is triggered to emit a sending signal to the output element.

2. The rotary device with automatic reset function of claim 1, wherein the sensing assembly comprises a light-emitting element and a light-receiving element, and an optical signal interaction is formed between the light-emitting element and the light-receiving element via a light path, the light path overlaps with a rotation plane of the light-shielding structure, and when the light-shielding structure rotates to a preset angle, the light path is blocked.

3. The rotary device with automatic reset function of claim 2 comprising multiple of the sensing assemblies, and an angle between the light paths of two adjacent sensing assemblies is the preset angle.

4. The rotary device with automatic reset function of claim 3, wherein an angle of the light paths of two adjacent of the sensing assemblies is 90° or 180°.

5. The rotary device with automatic reset function of claim 1, wherein the power assembly further comprises a casing, the casing is provided with a cavity with an opening, and the output element is arranged in the cavity, the extension part extends from the cavity to the outside of the casing through the opening, the sensing assembly is arranged in the cavity, and the light-shielding structure is arranged in the cavity.

6. The rotary device with automatic reset function of claim 5, wherein the casing further comprises a first stop structure, the first stop structure is disposed at the opening, and the first stop structure extending to the side close to the extension part through the opening; the conversion assembly comprises a second stop structure, the second stop structure is connected with the extension part, and the second stop structure is arranged on the outside of the cavity and extends toward the side close to the opening, the power assembly is configured to drive the second stop structure to rotate, the first stop structure and the second stop structure are in detachable contact.

7. The rotary device with automatic reset function of claim 6, wherein an angle between the first stop structure and the second stop structure is 90°.

8. The rotary device with automatic reset function of claim 5, wherein the conversion assembly further comprises a bearing, the bearing is provided between the extension part and the casing, and the bearing is provided on the side of the cavity close to the opening, the bearing is fixedly connected with the casing, and the bearing is in driving connection with the extension part.

9. The rotary device with automatic reset function of claim 1, wherein the conversion assembly further comprises a coupling, the coupling is connected with the extension part, and the coupling is in driving connection with the output element, and the extension part and the output element are rotatably connected through the coupling.

10. A display screen comprising a display assembly and a rotary device with automatic reset function, the display assembly being connected with the conversion assembly, wherein the rotary device with automatic reset function comprising:
  a conversion assembly comprising an extension part and a light-shielding structure, the light-shielding structure being connected with the extension part;
  a power assembly comprising an output element, the output element being in driving connection with the extension part, and the extension part being rotatable synchronously with the light-shielding structure; and
  at least one sensing assembly arranged to overlap with a rotation path of the light-shielding structure, and the conversion assembly being rotatable to various angles so that the light-shielding structure and the sensing assembly become detachably matched, wherein when the light-shielding structure and the sensing assembly are detachably matched, the sensing assembly is triggered to emit a sending signal to the output element;
  the display assembly connected with the conversion assembly, the display assembly being arranged on the side of the conversion assembly away from the power assembly.

11. The display screen of claim 10, wherein the sensing assembly comprises a light-emitting element and a light-receiving element, and an optical signal interaction is achieved between the light-emitting element and the light-receiving element through an light path, the light path overlaps with a rotation plane of the light-shielding structure, and when the light-shielding structure rotates to a preset angle, the light path is blocked.

12. The display screen of claim 11 comprising multiple of the sensing assemblies, and an angle between the light paths of two adjacent sensing assembly is the preset angle.

13. The display screen of claim 12, wherein the angle of the light paths of two adjacent sensing assembly is 90° or 180°.

14. The display screen of claim 10, wherein the power assembly further comprises a casing, the casing is provided with a cavity with an opening, and the output element is arranged in the cavity, the extension part extends from the cavity to the outside of the casing through the opening, the sensing assembly is arranged in the cavity, and the light-shielding structure is arranged in the cavity.

15. The display screen of claim 14, wherein the casing further comprises a first stop structure, the first stop structure is disposed at the opening, and the first stop structure extending to the side close to the extension part through the opening; the conversion assembly comprises a second stop structure, the second stop structure is connected with the extension part, and the second stop structure is arranged on the outside of the cavity and extends toward the side close to the opening, the power assembly is configured to drive the second stop structure to rotate, the first stop structure and the second stop structure are in detachable contact.

16. The display screen of claim 15, wherein an angle between the first stop structure and the second stop structure is 90°.

17. The display screen of claim 14, wherein the conversion assembly further comprises a bearing, the bearing is provided between the extension part and the casing, and the bearing is provided on the side of the cavity close to the opening, the bearing is fixedly connected with the casing, and the bearing is in driving connection with the extension part.

18. The display screen of claim 10, wherein the conversion assembly further comprises a coupling, the coupling is connected with the extension part, and the coupling is in driving connection with the output element, and the extension part and the output element are rotatably connected through the coupling.

* * * * *